(12) United States Patent
Tojo et al.

(10) Patent No.: US 6,345,155 B1
(45) Date of Patent: Feb. 5, 2002

(54) LIGHT-EMISSION CONTROL APPARATUS CAMERA APPARATUS AND LIGHT-EMISSION CONTROL METHOD

(75) Inventors: Takahiro Tojo, Saitama; Toru Shiono, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/489,812

(22) Filed: Jan. 24, 2000

(30) Foreign Application Priority Data

Jan. 25, 1999 (JP) .......................................... 11-016214
Apr. 16, 1999 (JP) .......................................... 11-110114

(51) Int. Cl.[7] ........................ G03B 15/02; G03B 15/03; H05B 41/14
(52) U.S. Cl. ........................ 396/159; 396/61; 396/164; 315/241 P
(58) Field of Search ................................ 396/159, 164, 396/166, 171, 172, 61, 62, 160, 161, 162, 163; 315/151, 241 P; 348/370, 371; 355/68

(56) References Cited

U.S. PATENT DOCUMENTS 4,297,011 A * 10/1981 Adams, Jr. .................. 396/204
5,822,628 A * 10/1998 Sato et al. .................. 396/159
5,839,005 A * 11/1998 Fukui .......................... 396/159

* cited by examiner

Primary Examiner—Russell Adams
Assistant Examiner—Arthur A Smith
(74) Attorney, Agent, or Firm—Frommer Lawrence & Haug LLP; William S. Frommer

(57) ABSTRACT

A light-emission control apparatus comprising a light-receiving element 2, an A/D converting section 6, an integrating section 7, a comparing section 8, and a control section 9. The light-receiving element 2 outputs a light-reception signal corresponding to an amount of light it has received. The A/D converting section 6 converts the light-reception signal to digital data. The integrating section 7 integrates the digital data, generating an integrated value. The comparing section 8 compares the integrated value with a predetermined threshold value. The control means outputs a light-emission stop request to a light-emitting device 11, thereby causing the device 11 to stop emitting light, when the integrated value reaches the predetermined threshold value.

19 Claims, 8 Drawing Sheets

FIG.6
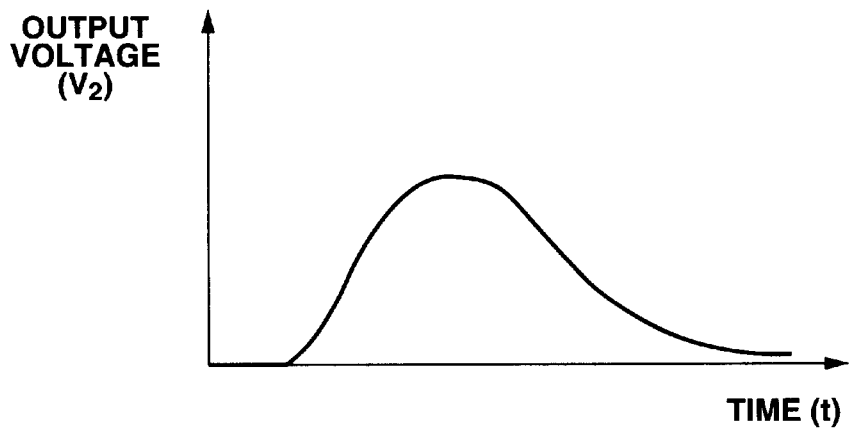
FIG.7A
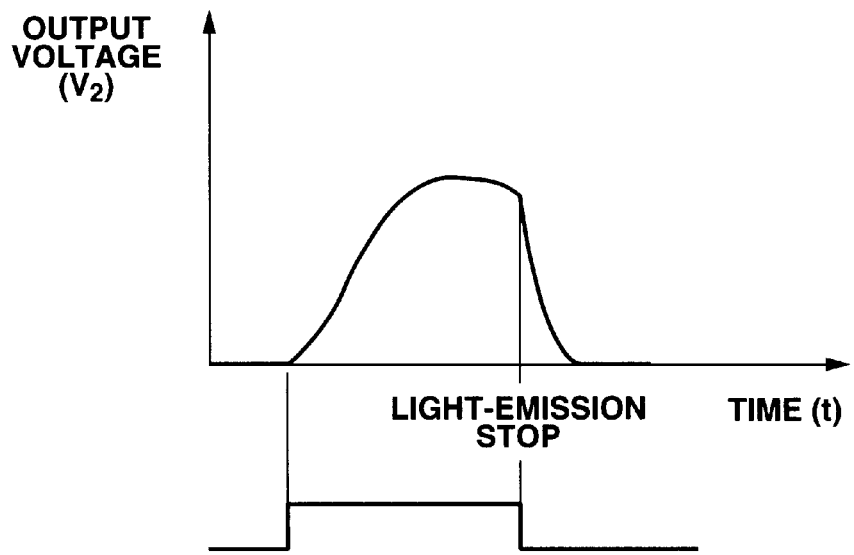
FIG.7B

FIG.8
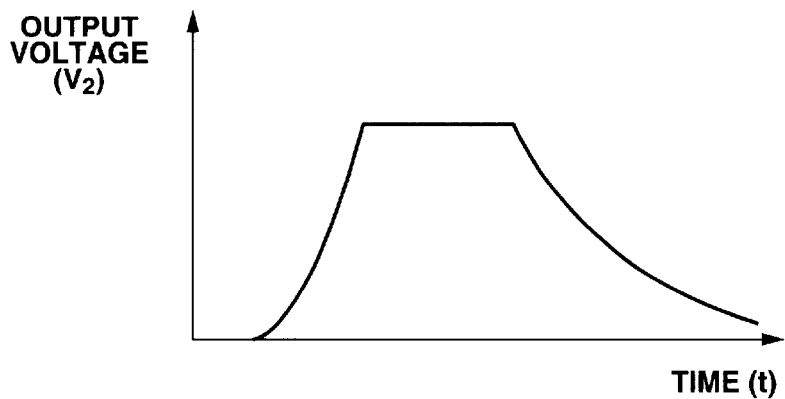
FIG.9A
FIG.9B
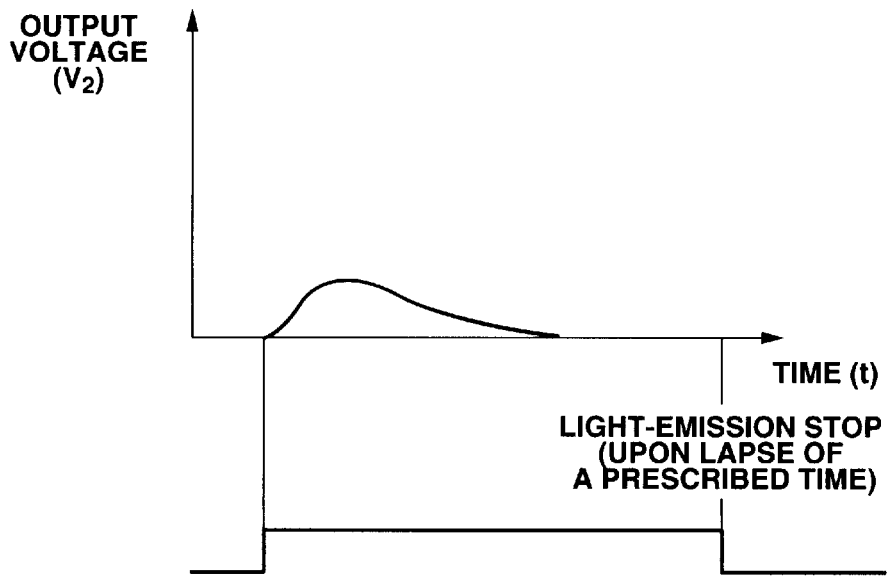

LIGHT-EMISSION CONTROL APPARATUS CAMERA APPARATUS AND LIGHT-EMISSION CONTROL METHOD

BACKGROUND OF THE INVENTION

The present invention relates to a light-emission control apparatus and a camera apparatus, each having a light-emitting means for emitting light, which is controlled in accordance with the light reflected from an object of photography. The invention also relates to a method of controlling emission of light applied to an object of photography.

Strobolight photography is performed in some cases in order to take clear-cut photographs. Strobolight photography is achieved by using a light-emitting device such as a strobolight. The emission of light from the light-emitting device is controlled to accomplish optimal strobolight photography.

FIG. 1 illustrates a conventional light-emission control system designed for use in strobolight photography. The system shown in FIG. 1 is operated in the following way to effect strobolight photography.

A light-emitting device 102 starts emitting light in response to a light-emission request made by the microprocessor unit (MPU) incorporated in a camera apparatus. A light-receiving element 103 receives the light reflected from an object 200 of photography. The output of the light-receiving element 103 is supplied to capacitors 104 and 105 and stored therein in the form of an electric charge. A voltage $V_1$ that corresponds to the electric charge stored in the capacitors 104 and 105 is compared with a reference value $V_s$. When the voltage $V_1$ reaches the reference value $V_s$, a comparing section 106 outputs a light-emission stop request. Upon receipt of the light-emission stop request the light-emitting device 102 stops emitting light, thereby controlling the emission of light. A resistor 107 determines the current accumulated by the capacitors 104 and 105. It should be noted that the capacitor 105 is connected to the ground by a switch 108. The switch 108 is changed over under the control of the microprocessor unit 101. When the switch 108 is so changed over, the capacitance of the charge-accumulating section is changed, thereby altering the characteristic of voltage transition to the reference value $V_s$.

FIG. 2 shows how the voltage $V_1$ changes with time. FIG. 3 illustrates how the voltage $V_1$ changes when the light-emitting device 102 stops emitting light. The comparing section 106 generates a light-emission stop request when the voltage $V_1$ reaches the reference value $V_s$. As seen from FIG. 3, the voltage $V_1$ ceases to change when the light-emitting device 102 stops emitting light in response to the light-emission stop request.

In the conventional light-emission control system, the capacitors 104 and 105 and the comparing section 106 constitute a section for detecting the amount of light the light-receiving element 103 receives. The capacitors 104 and 105 and the section 106 process analog data. Inevitably, the precision of the light-emission control greatly depends on the characteristics of the capacitors 104 and 105, the discharging of these capacitors and the performance of the comparing section 106.

Since the capacitors 104 and 105 and the comparing section 106 are major components of the light-emission control system, the operation characteristics of the system must be adjusted by using additional circuit components such as a variable resistor or an electronic volume during the manufacture of the system. The adjustment of operation characteristics is cumbersome and will increase the manufacturing cost of the light-emission control system.

Further, it is desired that the degree of freedom of controlling the light-emitting device 102 be enhanced to increase the precision of the light-emission control.

BRIEF SUMMARY OF THE INVENTION

The present invention has been made in view of the foregoing. The object of the present invention is to provide a light-emission control apparatus, a camera apparatus and a light-emission control method, which can control the emission of light with high precision and at low cost and which can increase the degree of freedom of controlling the light-emitting device used.

To achieve the object, a light-emission control apparatus according to the invention comprises: light-receiving means for outputting a light-reception signal corresponding to an amount of light received; analog-to-digital converting means for converting the light-reception signal to digital data; and control means for outputting a light-emission stop request to light-emitting means, thereby causing the light-emitting means to stop emitting light, when an integrated value obtained by integrating the digital data reaches a predetermined threshold value.

In the light-emission control apparatus, the light-emission stop request is output to the light-emitting means when an integrated value obtained by integrating the digital data reaches a predetermined threshold value.

That is, the light-emission control apparatus controls the light-emission preformed by the light-emitting means, in accordance with the output value of the light-receiving means.

To achieve the object, a camera apparatus according to the present invention comprises: an image sensing section for capturing an object image; light-emitting means designed to stop emitting light in response to a light-emission stop request; light-receiving means for outputting a light-reception signal corresponding to an amount of light received; analog-to-digital converting means for converting the light-reception signal to digital data; and control means for outputting a light-emission stop request to light-emitting means, thereby causing the light-emitting means to stop emitting light, when an integrated value obtained by integrating the digital data reaches a predetermined threshold value.

In the camera apparatus, the light-emission stop request is output to the light-emitting means when an integrated value obtained by integrating the digital data reaches a predetermined threshold value.

That is, in this camera apparatus, the light-emitting means stops emitting light in accordance with the digital output value of the light-receiving means.

The light-emission control apparatus according to the invention comprises: light-receiving means for outputting a light-reception signal corresponding to an amount of light received; analog-to-digital converting means for converting the light-reception signal to digital data; and control means for outputting a light-emission stop request to light-emitting means, thereby causing the light-emitting means to stop emitting light, when an integrated value obtained by integrating the digital data reaches a predetermined threshold value. The apparatus can therefore make the light-emitting means stop emitting light when the integrated value reaches the predetermined threshold value.

That is, the light-emission control apparatus can control the termination of the light emission effected by the light-emitting means, in accordance with the digital data, i.e., the output value of the light-receiving means.

The output value of the light-receiving means is converted to digital data. The digital data, not analog data, is processed to control the termination of the light emission. The apparatus can therefore control the emission of light with high precision.

The camera apparatus of the present invention comprises: an image sensing section for capturing an object image; light-emitting means designed to stop emitting light in response to a light-emission stop request; light-receiving means for outputting a light-reception signal corresponding to an amount of light received; analog-to-digital converting means for converting the light-reception signal to digital data; and control means for outputting a light-emission stop request to light-emitting means, thereby causing the light-emitting means to stop emitting light, when an integrated value obtained by integrating the digital data reaches a predetermined threshold value.

In other words, with the camera apparatus the termination of the light emission effected by the light-emitting means can be controlled in accordance with the digital data, i.e., the output value of the light-receiving means.

The output value of the light-receiving means is converted to digital data, The digital data, not analog data, is processed to control the termination of the light emission. Therefore, the emission of light can be controlled with high precision in the camera apparatus.

BRIEF DESCRIPTION OF THE SEVERAL VIEWS OF THE DRAWINGS

FIG. 6 is a graph illustrating how the output of the light-receiving element used in the system of FIG. 4 changes with time as it receives the light reflected from an object of photography;

FIG. 7 is a graph showing how the output of the light-receiving element changes with time until the light-emitting device stops emitting light in response to a light-emission stop request;

FIG. 8 is a graph showing how the output of the light-receiving element changes with time when saturated;

FIG. 9 is a graph used for explaining the case of being required to stop the light-emission after elapsing of the prescribed time when the output level of the light-receiving element is small.

DETAILED DESCRIPTION OF THE INVENTION

An embodiment of the present invention will be described, with reference to the accompanying drawings. This embodiment is a light-emission control system that incorporates a light-emission control apparatus according to this invention, which is designed to control a light-emitting device such as a strobolight.

Figure 1:
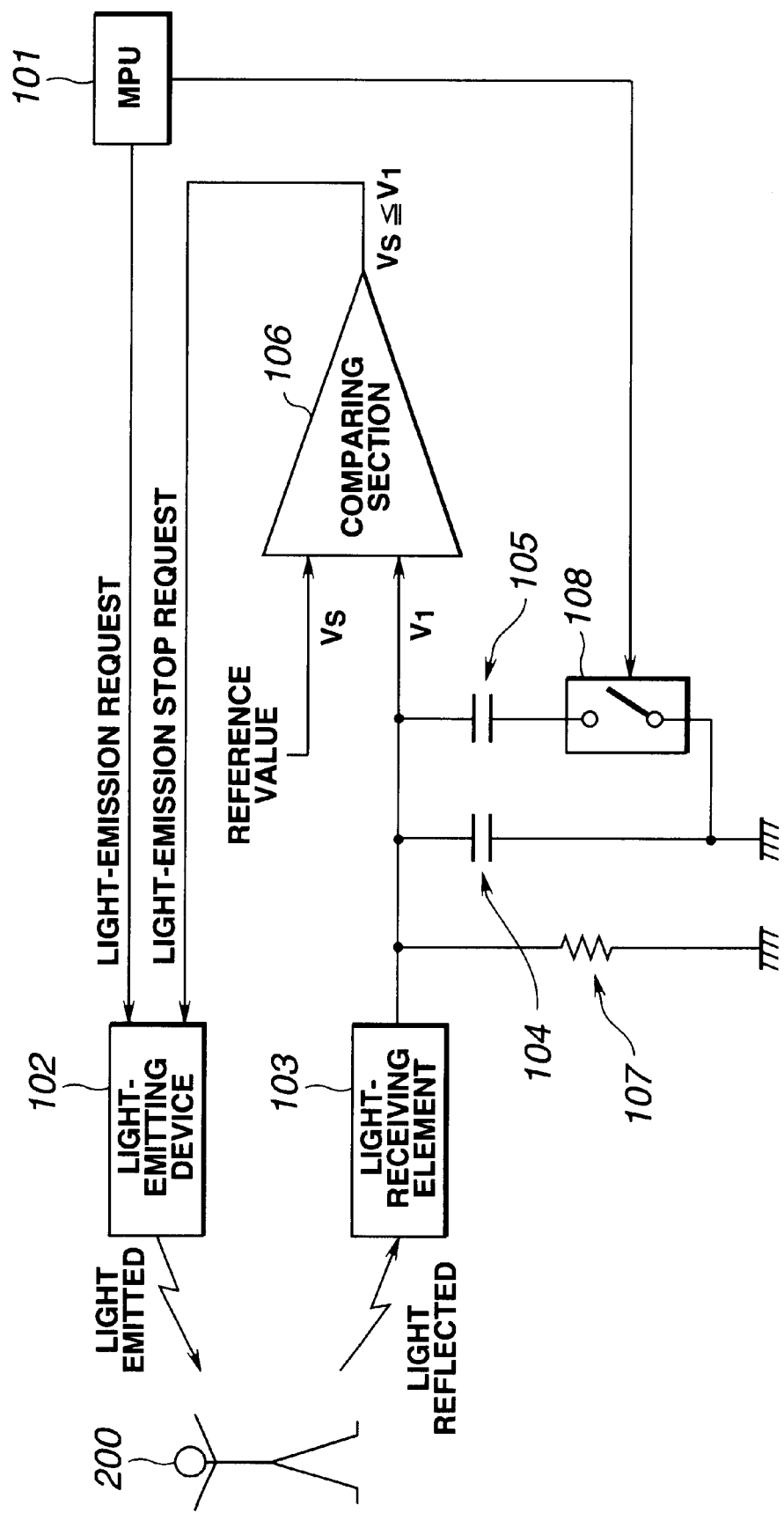
FIG. 1 is a block diagram of a conventional light-emission control system that controls a light-emitting device.
Figure 2:
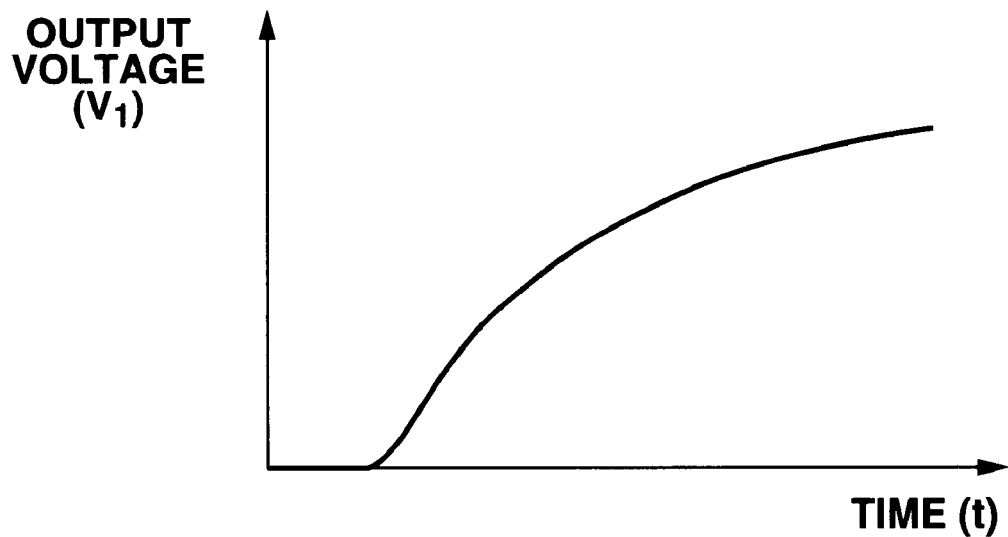
FIG. 2 is a graph showing how the output of the light-receiving element changes with time in the conventional light-mission control system.
Figure 3:
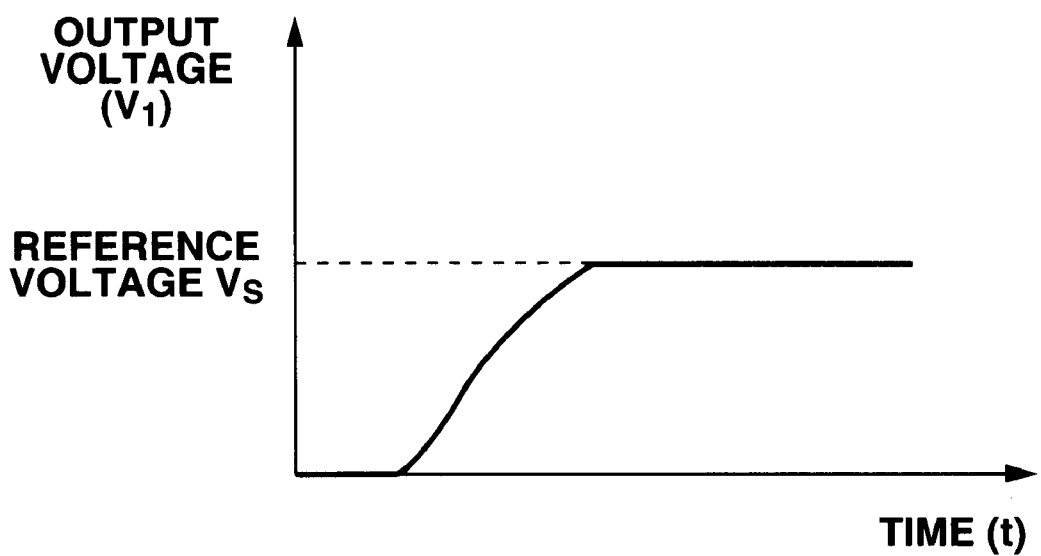
FIG. 3 is a graph illustrating how the output of the light-receiving element changes with time when the light-emitting device stops emitting light in the conventional light-mission control system.
Figure 4:
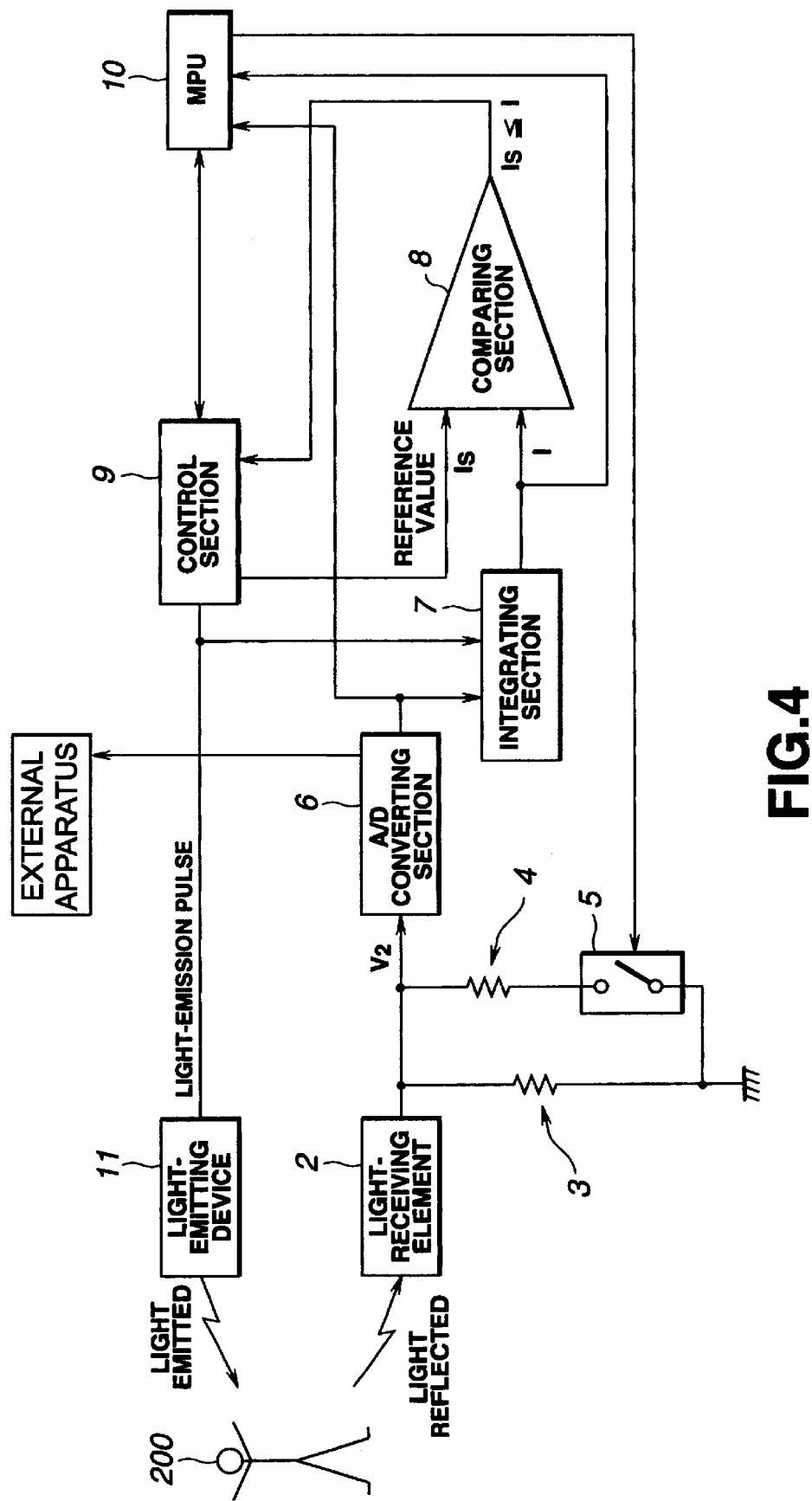
FIG. 4 is a block diagram showing a light-emission control system that incorporates a light-emission control apparatus according to the present invention.

As shown in FIG. 4, the light-emission control system comprises a light-receiving element 2 (or light-receiving means), an A/D converting section 6, an integrating section 7, a comparing section 8, and a control section 9, and a light-emitting device 11. The light-receiving element 2 generates a light-reception signal corresponding to the amount of light it has received. The A/D converting section 6 converts the output of the light-receiving element 2 to digital data. The integrating section 7 integrates outputs of the light-receiving element 2, obtaining an integrated value. The comparing section 8 compares the integrated value with a prescribed reference value. The control section 9 generates a light-emission stop request when the comparing section 8 detects that the integrated value reaches the reference value, i.e., a prescribed threshold value. The light-emission stop request is supplied to the light-emitting device 11. Upon receipt of the light-emission stop request, the light-emitting device 11 stops emitting light.

In the light-emission control system, the A/D converting section 6 converts the outputs of the light-receiving element 2 to digital values, and the digital values are integrated into an integrated value. When the integrated value reaches the reference value, the comparing section generates a light-emission stop request. The light-emission stop request is supplied to the light-emitting device 11. Upon receipt of the request, the device 11 stops emitting light.

The light-receiving element 2 receives the light reflected from an object 200 of photography. The element 2 generates a light-reception signal that corresponds to the amount of the light it has received. The output of the light-receiving element 2 is input to the A/D converting section 6.

The output level of the light-receiving element 2 is determined by resistors 3 and 4. In other words, the resistors 3 and 4 determine the output gain of the light-receiving element 2. The resistor 4 is connected to the ground by a switch 5, which is turned on or off by a microprocessor unit (MPU) 10. Since the resistor 4 can be turned on and off, it is possible to control the output gain of the light-receiving element 2. When the gain is decreased, the output value of the light-receiving element 2 is prevented from being saturating.

Both resistors 3 and 4 may be variable resistors that can be controlled by the microprocessor unit (MPU) in order to control the output gain of the light-receiving element 2.

The A/D converting section 6 receives the light-reception signal generated by the light-receiving element 2 whose gain has been controlled (or adjusted) by the resistors 3 and 4 as described above. The section 6 converts the output voltage $V_2$ of the light-receiving element 2 to digital data. The digital data can meet the precision requirement demanded of the system merely by selecting, for example, appropriate sampling frequency and quantization resolution for the A/D converting section 6. The voltage value, which is in the form of digital data generated by the A/D converting section 6, is input to the integrating section 7.

The integrating section 7 integrates the output values of the A/D converting section 6, obtaining an integrated voltage value. That is, the section 7 generates digital data representing the total amount of light the light-receiving element 2 has received. The integrating section 7 is designed to start integrating the voltage values output by the A/D converting section 6, when it detects the light-emission start request output from the control section 9 to the light-emitting device 11. The integrating section 7 is so designed that the integrated value it holds is cleared immediately before it starts integrating the output values of the AID converting section 6. For example, the integrated value held in the section 7 is cleared when the section 7 receives a light-emission star request.

The integrated value calculated by the integrating section 7 is input to the comparing section 8 and the microprocessor unit 10.

The comparing section 8 compares the integrated value obtained by the integrating section 7 with the reference value of digital data, which the control section 9 has output. The data showing the result of this comparison is supplied to the control section 9. The reference value is determined by various data items concerning the photographing now performed. The data items are the distance to the object, the iris opening, the exposure sensitivity, the guide number of light-emitting device 11, the output gain of light-receiving element 2, and the like. For instance, the output gain of the light-receiving element 2 may be increased, thereby to change the output of the element 2 to a level optimal for sampling. If the output gain of light-receiving element 2 is thus changed, the value input to the A/D converting section 6 may become almost same, though the value that corresponds to the amount of light the element 2 has received is different. The reference value is determined from the gain selected in such a case. This makes it possible to control the light-emitting device 11 on the basis of the amount of light the light-receiving element 2 has actually received.

When the comparing section 8 detects that the integrated value reaches the reference value, it is determined that the light-emitting device 11 has emitted light in a desired manner.

In accordance with the result of comparison made by the comparing section 8, the control section 9 generates a light-emission stop request to cause the light-emitting device 11 to stop emitting light. To state it more correctly, the control section 9 outputs the light-emission stop request when the comparing section 8 determines that the integrated value has reached the reference value.

The control section 9 outputs a light-emission start request to cause the light-emitting device 11 to start emitting light. More specifically, the control section 9 outputs the light-emission start request to the light-emitting device 11 when it receives a light-emission request from the microprocessor unit 10.

The various requests to the light-emitting device 11 are made at the leading and trailing edges of a pulse signal. For example, the control section 9 generates the light-emission start request at the leading edge of the pulse signal and the light-emission stop request at the trailing edge of the pulse signal.

The microprocessor unit 10 controls the components of the light-emission control system, which are shown in FIG. 4. In addition, the unit 10 controls the some other components of the system, which are not illustrated in FIG. 4.

Figure 5:
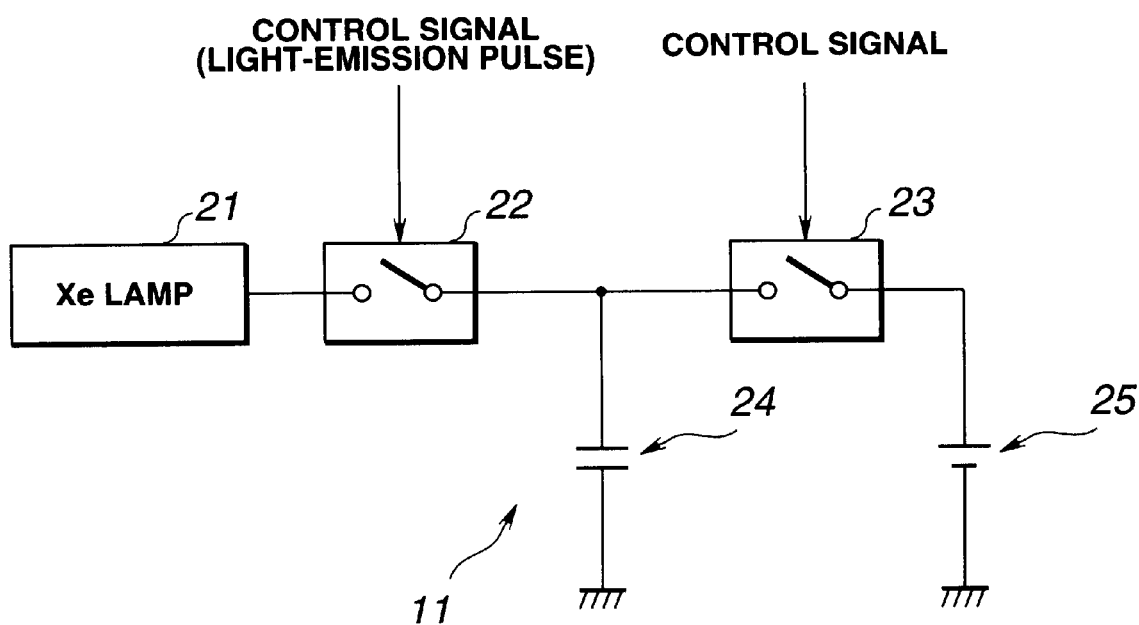
FIG. 5 is a diagram depicting the light-emitting device, which controlled by the light-emission control system shown in FIG. 4.

The light-emitting device 11 starts emitting light in response to the light-emission start request and stops emitting light in response to the light-emission stop request. FIG. 5 shows the structure of the light-emitting device 11. As shown in FIG. 5, the device 11 comprises a light-emitting section 21, switches 22 and 23, a capacitors 24, and a power supply 25. The light-emitting section 21 is, for example, a xenon (Xe) lamp and emits light when supplied with a drive current. The switch 22 connects the capacitor 24 to the light-emitting section 21, and the switch 23 connects the power supply 25 to the capacitor 24. The capacitor 24 is provided to drive the light-emitting section 21. The power supply 25 is provided to supply power to the capacitor 24. The light-emitting device 11 further comprises a control section (not shown) for supplying a control signal, which controls the switches 22 and 23.

It will now be explained how the light-emitting device 11, thus constructed, operates. First, the control signal the control section (not shown) has generated in response to a light-emission start request is supplied to the switch 22, whereby the switch 22 connects the capacitor 24 to the light-emitting section 21. A voltage is thereby applied from the capacitor 22 to the light-emitting section 21. To cause the light-emitting section 21 to stop emitting light, the control signal the control section (not shown) has generated in response to a light-emission stop request is supplied to the switch 22, whereby the switch 22 disconnects the capacitor 24 from the light-emitting section 21. As a result, a voltage is no longer applied to the light-emitting section 21.

When the capacitor 24 is discharged as the light-emitting section 21 emits light or when the light-emitting device 11 is turned on, the capacitor 24 must be electrically charged. To electrically charge the capacitor 24, the control signal is supplied from the control section (not shown) to the switch 23, changing over the switch 23 to connect the power supply 25 to the capacitor 24. The control section (not shown) monitors how the capacitor 24 is electrically charged. When the capacitor 24 is completely charged, the switch 23 is changed over, disconnecting the power supply 25 from the capacitor 24.

In the light-emission control system that has the structure specified above, the microprocessor unit 10 generates a light-emission stop request from the integrated value that the light-receiving element 2 has output. The light-emission stop request, thus generated, is supplied to the light-emitting device 11, causing the device 11 to stop emitting light.

It will now be described in detail how to control the light-emitting device 11 in accordance with the output of the light-receiving element 2 and how the output gain of the light-receiving element 2 is controlled.

The light-emitting device 11 is controlled in accordance with the output of the light-receiving element 2, as will be explained below.

FIG. 6 illustrates how the output voltage $V_2$ of the light-receiving element 2 changes with time as the element 2 receives the light emitted from the light-emitting device 11 after the device 11 starts emitting light until the device 11 stops emitting light.

As seen from FIG. 6, the output voltage $V_2$ abruptly rises when the light-emitting device 11 starts emitting light. As time passes, the light reflected from the object of photography decreases, and the output voltage $V_2$ falls.

When the integrated value of the output voltage $V_2$ that changes in this fashion reaches the reference value, the control section 9 outputs a light-emission stop request at the trailing edge of the light-emission pulse, as is illustrated at B in FIG. 7. Upon receipt of the light-emission stop request, the light-emitting device 11 stops emitting light. The control section 9 generates the light-emission stop request in the following way. First, the A/D converting section 6 converts the output voltage $V_2$ of the light-receiving element 2 to digital data. Then, the integrating section 7 integrates the digital data representing the output voltage $V_2$, thereby generating an integrated value. The comparing section 8 compares the integrated value with the reference value. The control section 9 generates a light-emission stop signal on the basis of the result of comparison performed by the comparing section 8. The output voltage $V_2$ of the light-receiving element 2 changes as shown in at A in FIG. 7 after the element 2 has stopped emitting light in response to the light-emission stop request.

As mentioned above, the comparing section 8 compares the integrated value with the reference value and the light-emitting device 11 stops emitting light in accordance with the result of the comparison. Since the digital data of the total amount of light the light-receiving element 2 has received, is used, the light-emitting device 11 can be controlled with high precision.

The gain of the light-receiving element 2 is controlled in the following manner.

The output voltage $V_2$ of the light-receiving element 2 may be saturated, depending upon the intensity of the light the element 2 receives. For example, the output voltage $V_2$ may not rise above a certain level as is illustrated in FIG. 8. This happens when the light reflected from the object is very intense (as in the case of macro photography). When the output of the light-receiving element 2 is saturated, failing to rise above a specific level, it is impossible for the integrating section 7 to obtain an accurate integrated value, i.e., the total amount of light the element 2 has received. Hence, the light-emitting device 11 cannot be controlled to stop emitting light.

Therefore, the output of the light-receiving element 2 needs to be prevented from being saturated. To this end, the switch 5 is closed, connecting the resistor 4 to the ground. The output gain of the light-receiving element 2 is thereby lowered. This prevents the saturation of the output voltage of the light-receiving element 2.

The output gain of the element 2 can be controlled as the microprocessor unit 10 controls the switch 5.

For example, the resistor 4 is connected to and disconnected from the ground in accordance with various data items from which the intensity of light reflected from the object can be estimated, thereby controlling the output gain of the element 2 to prevent the saturation of the output of the element 2. Among these data items are the distance to the object, the iris opening, the exposure sensitivity, the guide number of light-emitting device 11, and the like.

Since the output gain of the light-receiving element 2 can be selected, the output of the light-receiving element 2 would not be saturated. Therefore, the integrating section 7 can always obtain an integrated value.

It is true that, as indicated above, the emission of light from the device 11 can be controlled even if the output of the light-receiving element 2 is saturated. However, the emission of light can be controlled with higher precision by lowering the output gain of the element 2 to prevent the saturation of the element 2 as in the present invention.

The output gain of the light-receiving element 2 need not be always selected beforehand in order to prevent the saturation of the output of the element 2. Alternatively, an appropriate gain may be selected on the basis of the output voltage of the element 2. For example, the switch 5 may be controlled to select an proper gain if the integrated value output from the integrating section 7 tends to increase too fast and it can therefore be predicted that the output of the element 2 will be saturated.

The resistors 3 and 4, which are used to select an output gain for the light-receiving element 2, may be replaced by a variable resistor. If this case, the output gain can be changed continuously to any desired value.

Furthermore, the control section 9 may generate the light-emission stop request upon lapse of a prescribed time after the light-emitting device 11 has begun to emit light, thereby to causing the light-emitting device 11 to stop emitting light. If this is the case, the light-emitting device 11 can be forced to stop emitting light in response to the light-emission stop request generated when the prescribed time elapses as shown in FIG. 9, even if the total amount of light the light-receiving element 2 has received does not reach a predetermined value, that is, even if the integrated value does not reach the reference value.

This method of terminating the emission of light from the device 11 is useful and effective in the case where the output level of the light-receiving element 2 is too low to achieve to control the emission of light appropriately, in case, for example, the output level of the element 2 may be so low, because the light reflected from the object is weak (because the distance from the object is long) while the output gain of the element 2 remains small.

The prescribed time upon lapse of which the control section 9 generates a light-emission stop request is determined from the operating characteristics of the light-emitting device 11 and the like. For example, the prescribed time is determined on the basis of the distance to the object, the iris opening, the exposure sensitivity, the guide number of light-emitting device 11, and the like, as has been mentioned already.

Unless the integrated value reaches the reference value, the light-emitting device 11 is made to stop emitting light upon lapse of the prescribed time. The device 11 can therefore be made to stop emitting light as mentioned above, even if an insufficient output gain is selected for the light-receiving element 2 and the output level of the element 2 becomes inevitably too low.

Figure 10:
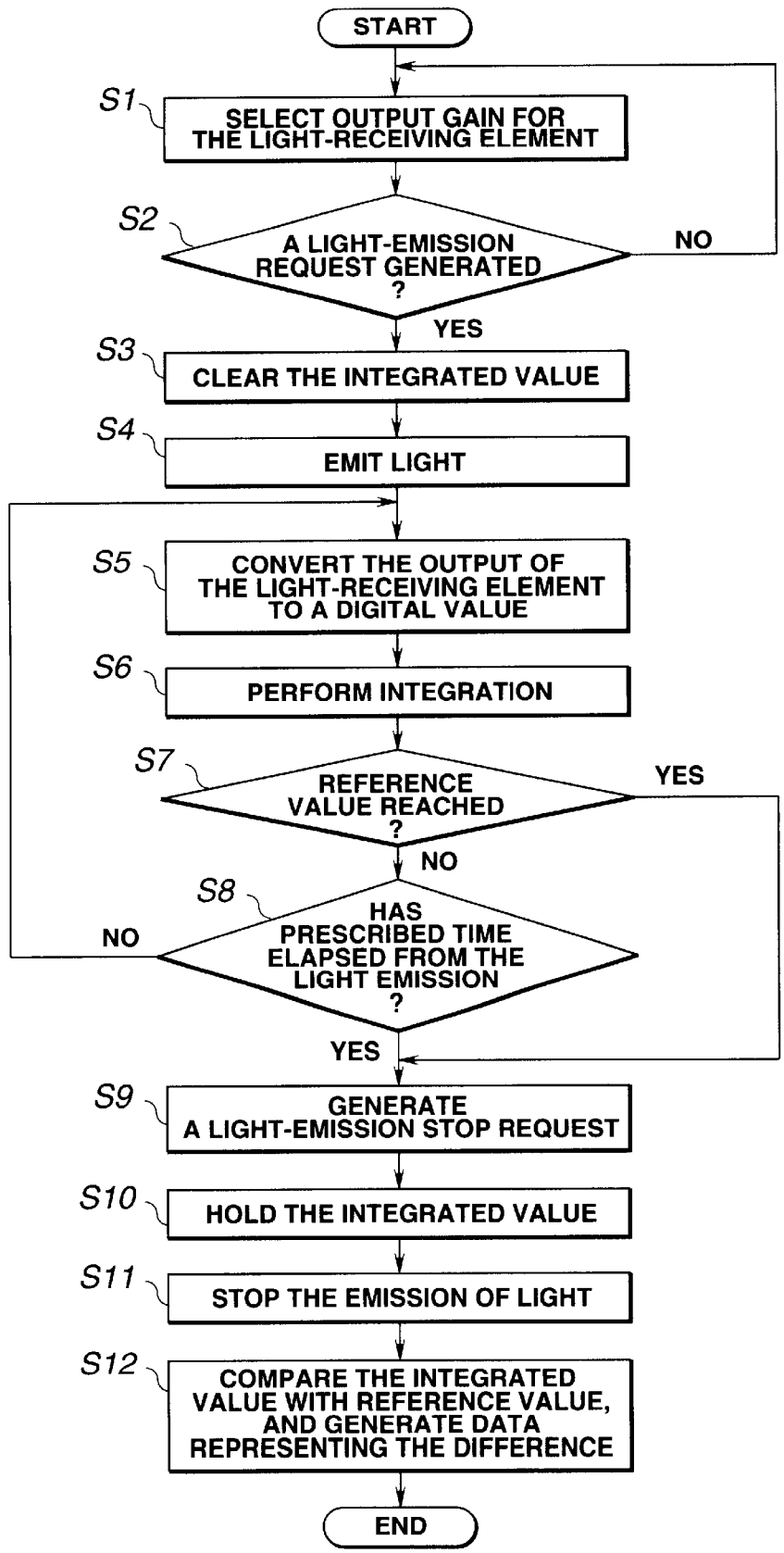
FIG. 10 is a flow chart explaining the sequence of operations performed in the system of FIG. 4 to cause the light-emitting device to stop emitting light when a light-emission stop request is generated when an integrated value reaches a reference value or a prescribed time elapses after an output gain has been selected.

The output of the light-receiving element 2 controls the emission of light from the light-emitting device 11 as has been described above. In addition, an appropriate output gain is selected for the element 2 so that the element 2 may generates an output at a desired level. The sequence of these operations will be explained in detail, with reference to the flow chart of FIG. 10.

First, in Step S1, an output gain is selected for the light-receiving element 2. More precisely, the switch 5 connects the resistor 4 to the ground, or disconnects the same from the ground, thereby changing the output level of the light-receiving element 2 to the best possible value.

The selection of the output gain is continued until it is determined in Step S2 that a light-emission request has been generated. The output gain for the light-receiving element 2 is thereby determined on the basis of the data acquired immediately before the light-emission request is generated, e.g., the distance to the object and the like.

After the light-emission request has been detected and the element 2 has got the output gain selected, the integrated value is cleared in the integrating section 7 in Step S3. In Step S4, the light-emitting device 11 emits light.

That is, the light-emitting device 11 stars emitting light in response to the light-emission start request. In Step S5, the output voltage of the light-receiving element 2 is converted to a digital value. In Step S6, the integrating section 7 starts integrating the output voltage.

In the next step, i.e., Step S7, it is determined whether the integrated value the section 7 calculates has reached the reference value or not. If the integrated value has reached the reference value, the operation goes to Step S9. If the integrated value has not reached the reference value, the operation goes to Step S8.

In Step S8, it is determined whether the prescribed time has elapsed or not from the time the light-emitting device started emitting light. If the prescribed time has elapsed, the operation goes to Step 9. If the prescribed time has not elapsed, the operation returns to Step S5, and Step 5 to Step 7 are repeated, thereby processing the digital data.

In Step S9, the control section 9 makes a light-emission stop request to the light-emitting device 11.

If it is determined in Step S7 the integrated value the section 7 calculates has reached the reference value or if it is determined in Step S8 the prescribed time has elapsed though the integrated value has not reached the reference value, a light-emission stop request is made to the light-emitting device 11. On the other hand, if the integrated value has not reached the reference value and if the prescribed time has not elapsed, the integrating section 7 will keep integrating the output value of the light-receiving element 2, i.e., the digital data output from the A/D converting section 6.

After a light-emission stop request is made in Step S9, the integrated value calculated by the integrating section 7 is held in Step S10. In Step S11, the light-emitting device 11 stops emitting light in response to the light-emission stop request.

Then, in Step S12, the comparing section 8 compares the integrated value with the reference value, thereby finding the difference between these values. The difference is data that is based on the amount of light the light-receiving element 2 has received.

As has been described, an output gain is selected for the light-receiving element 2, and the light-emitting device 11 is controlled in accordance with the digital data representing the integrated value of the voltage output from the light-receiving element 2.

As mentioned above, the data acquired in Step S12 is based on the amount of light the element 2 has received. This data (referred to as light data) can be used to perform the process that will be described below.

The user of the camera apparatus incorporating the light-emitting device 11 may push the shutter button, with the lens cap on, causing the device 11 to emit light to perform strobolight photography. This error can be detected, provided that the lens cover also covers the light-receiving element 2. It may seem possible to detect the error by reading the output from the light-receiving element 2. However, the error cannot be detected from only the output of the light-receiving element 2. The output of the element 2 cannot serve to determine whether the lens cap is on or the camera apparatus is used in a dark place and where there is few reflecting object. In view of this, the integrated value is compared with the reference value in this invention, finding the amount of light the element 2 has received. From above mentioned comparison it can be reliably determined whether the lens cap is on or not.

With the present invention it is also possible to modify an image by using the light data. To be more specific, if the integrated value has not reached the reference value, it is determined that the light-emitting device 11 has emitted but an insufficient amount of light. In this case, it is inferred that the light reflected from the object is not sufficiently intense, and measures are taken to modify the image. Moreover, an alarm may be generated from the light data when the amount of light is insufficient. The user of the camera apparatus can therefore know that the light-emitting device 11 has not applied a sufficient amount of light to the object. Furthermore, it is possible to modify the image and generate the alarm in accordance with how much the integrated value is less than the reference value.

In addition, the light data can be added to the image data representing the object of photography. The data added can then be used not only to modify the image, but also to accomplish other processes.

Figure 11:
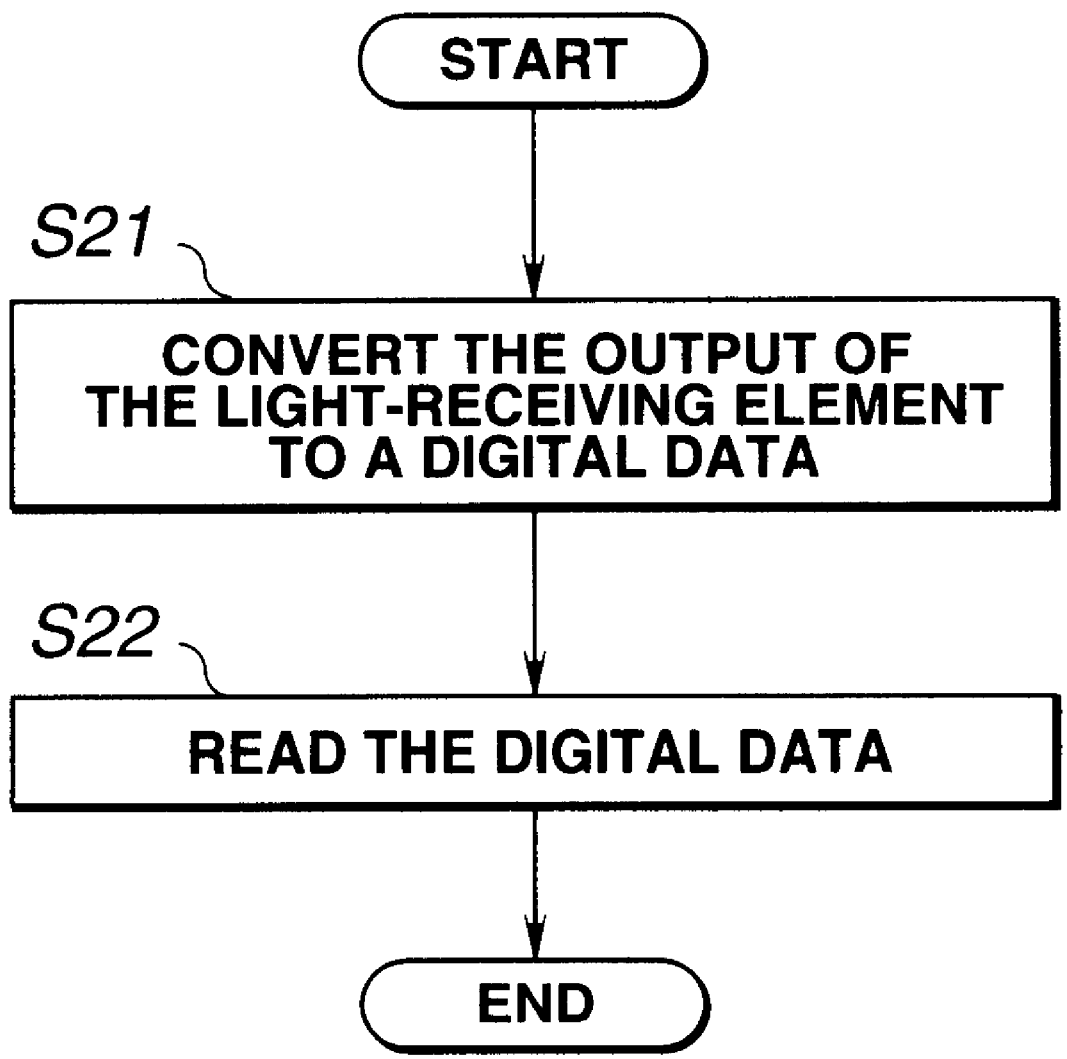
FIG. 11 is a flow chart explaining the sequence of operations carried out to acquire digital data continuously from the A/D converting section provided in the system of FIG. 4.

The light data can be acquired not only when a light-emission stop request is made to the light-emitting device 11. The data of the integrated value can be read from the integrating section 7 at any time when no light-emission stop request is made. Moreover, as shown in FIG. 11, the A/D converting section 6 may convert the output of the light-receiving element 2 to a digital data at any time (Step S21), and the digital data may then be read from the A/D converting section 6 at any time (Step S22).

The digital data that the A/D converting section 6 generates from the output of the light-receiving element 2 can always be supplied to the microprocessor unit 10. The unit 10 can therefore use the intensity of light incident to the element 2, as one of data items.

Among various camera apparatuses available is a video camera which has a liquid crystal display and which can record images and reproduce them on the liquid crystal display. This video camera may incorporate the light-emission control apparatus of the present invention. If so, the back light of the liquid crystal display, for example, can be adjusted during the playback of the recorded images, in accordance with the data showing the amount of light the video camera receives.

Further, from the light data it can be determined whether the components of the light-emission control apparatus, including the light-receiving element 2, are operating normally or not.

As indicated above, in case that the output gain of the light-receiving element 2 is low, a light-emission stop request is therefore output upon lapse of the prescribed time because the integrated value has not reached the reference value. If the emission of light is stopped upon lapse of the prescribed time, this event may be used as light data.

From the above the present invention can be said to be advantageous in the following respects.

Since the data processed is digital one generated by the A/D converting section 6, the precision of controlling the emission of light can be much higher than in the conventional light-emission control system.

The reference value for amount of light received, the prescribed time upon lapse of which to generated the light-emission stop request, and the like can be easily changed by means of software. Thus, the control values can be set on the basis of the conditions in which the camera apparatus is used. In other words, the degree of freedom of controlling the light-emitting device 11 is enhanced.

Since almost all processing sections process digital data, they can be incorporated in a single processing unit LSI and can therefore be provided at low cost. It therefore suffices to use less analog processing components (e.g., a comparator for comparing the output value of a capacitor with a reference value) than in the conventional light-emission control system. The system of the present invention can therefore be manufactured at a lower cost.

When the light-receiving element 2 receives very intense light, its output may be saturated. In the system of this invention, the output gain of the element 2 is switched if the element 2 receives intense light, thereby preventing the saturation of the output of the element 2. Further, the emission of light can be controlled in accordance with the output gain thus switched.

The digital data representing the output of the light-receiving element 2 is read at all times, no matter whether or not the light-emitting device 11 is emitting light. It is therefore possible to determine the intensity of the light that the element 2 is receiving from outside. The data showing the intensity of light, thus determined, can be used as one of data items for controlling the camera apparatus.

It is possible to provide the light-emission control system in the form of an apparatus that is separated from the camera apparatus. Then, the light-emission control system can be used in combination with still cameras that use photographic film.

The embodiment of the invention, described here, is a light-emission control system. Nevertheless, the present invention may be applied to a camera apparatus that incorporates such a light-emission control system. The camera apparatus of this invention may comprise the light-receiving element 2, resistors 3 and 4, A/D converting section 6, integrating section 7, comparing section 9 and MPU10.

The light-receiving element 2 generates a current that corresponds to the amount of light it has received. The A/D converting section 6 converts the current to digital data. The integrating section 7 integrates the digital data, thus generating an integrated value that is equivalent to the amount of light the element 2 has received.

What is claimed is:

1. A light-emission control apparatus comprising:
   light-receiving means for outputting a light-reception signal corresponding to an amount of light received;
   first control means for controlling an output gain of the light-receiving means in accordance with said amount of light received;
   analog-to-digital converting means for converting the light-reception signal to digital data; and
   second control means for outputting a light-emission stop request to light-emitting means, thereby causing the light-emitting means to stop emitting light, when an integrated value obtained by integrating the digital data reaches a predetermined threshold value.

2. A light-emission control apparatus according to claim 1, wherein the second control means comprises;
   an integrating section for integrating the digital data, thereby generating the integrated value;
   a comparing section for comparing the integrated value with the predetermined threshold value; and
   a control section for outputting the light-emission stop request to the light-emitting means, causing the light-emitting means to stop emitting light, when the integrated value reaches the predetermined threshold value.

3. A light-emission control apparatus according to claim 1, wherein the second control means outputs the light-emission stop request upon a lapse of a prescribed time.

4. A light-emission control apparatus according to claim 1, wherein the analog-to-digital converting means supplies the digital data to an external apparatus.

5. A light-emission control apparatus according to claim 1, wherein said output gain is selected for the light-receiving means further in accordance with photographing data of a camera apparatus.

6. A light-emission control apparatus according to claim 5, wherein the photographing data represents at least of the photographing conditions including a distance to an object of photography, an iris opening, an exposure sensitivity, and operating characteristics of the light-emitting means.

7. A camera apparatus comprising:
   an image sensing section for capturing an object image;
   light-emitting means designed to stop emitting light in response to a light-emission stop request;
   light-receiving means for outputting a light-reception signal corresponding to an amount of light received;
   first control means for controlling an output gain of the light-receiving means in accordance with said amount of light received;
   analog-to digital converting means for converting the light-reception signal to digital data; and
   second control means for outputting said light-emission stop request to said light-emitting means, thereby causing the light-emitting means to stop emitting light, when an integrated value obtained by integrating the digital data reaches a predetermined threshold value.

8. A camera apparatus according to claim 7, wherein the second control means comprises;
   an integrating section for integrating the digital data, thereby generating the integrated value;
   a comparing section for comparing the integrated value with the predetermined threshold value; and
   a control section for outputting the light emission stop request to the light-emitting means, causing the light-emitting means to stop emitting light, when the integrated value reaches the predetermined threshold value.

9. A camera apparatus according to claim 7, wherein the second control means outputs the light-emission stop request upon a lapse of a prescribed time.

10. A camera apparatus according to claim 7, wherein photographing data is corrected in accordance with data representing whether the integrated value has reached the predetermined threshold value and/or data representing whether the light-emission stop request has been output upon lapse of a prescribed time.

11. A camera apparatus according to claim 7, wherein an alarm is generated to indicate that the integrated value has reached the predetermined threshold value and/or that the light-emission stop request has been output, in accordance with data representing whether the integrated value has reached the predetermined threshold value and/or data representing whether the light-emission stop request has been output upon lapse of a prescribed time.

12. A camera apparatus according to claim 7, wherein data showing that the integrated value has reached the predetermined threshold value and/or that the light-emission stop request has been output is added to photographing data upon lapse of a prescribed time.

13. A camera apparatus according to claim 7, wherein the analog-to-digital converting means supplies the digital data to an external apparatus.

14. A camera apparatus according to claim 7, wherein said output gain is selected for the light-receiving means further in accordance with photographing data.

15. A camera apparatus according to claim 14, wherein the photographing data represents at least of the photographing conditions including a distance to an object of photography, an iris opening, an exposure sensitivity, and operating characteristics of the light-emitting means.

16. A light-emission control method comprising the steps of:

outputting a light-reception signal corresponding to an amount of light received by light-receiving means;

controlling an output gain of the light-receiving means in accordance with said amount of light received;

converting the light-reception signal to digital data by analog-to-digital converting means; and outputting a light emission stop request to light-emitting means by control means, causing the light-emitting means to stop emitting light, when an integrated value obtained by integrating the digital data reaches a predetermined threshold value.

17. A light-emission control method according to claim 16, wherein the control means outputs the light-emission stop request upon lapse of a prescribed time.

18. A light-emission control method according to claim 16, further comprising a step of selecting said output gain for the light-receiving means further in accordance with photographing data of a camera apparatus.

19. A light-emission control method according to claim 18, wherein the photographing data represents at least of the photographing conditions including a distance to an object of photography, an iris opening, an exposure sensitivity, and operating characteristics of the light-emitting means.

* * * * *